United States Patent
Dubrova et al.

(10) Patent No.: US 10,623,187 B2
(45) Date of Patent: Apr. 14, 2020

(54) GENERATING CRYPTOGRAPHIC CHECKSUMS

(71) Applicant: Telefonaktiebolaget LM Ericsson (publ), Stockholm (SE)

(72) Inventors: Elena Dubrova, Sollentuna (SE); Gunnar Mildh, Sollentuna (SE); Mats Näslund, Bromma (SE); Göran Selander, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 234 days.

(21) Appl. No.: 15/558,844

(22) PCT Filed: May 4, 2015

(86) PCT No.: PCT/EP2015/059482
§ 371 (c)(1),
(2) Date: Sep. 15, 2017

(87) PCT Pub. No.: WO2016/177385
PCT Pub. Date: Nov. 10, 2016

(65) Prior Publication Data
US 2018/0069706 A1    Mar. 8, 2018

(51) Int. Cl.
*H04L 9/32* (2006.01)
*G06F 11/10* (2006.01)
(Continued)

(52) U.S. Cl.
CPC ........ *H04L 9/3242* (2013.01); *G06F 11/1004* (2013.01); *H03M 13/09* (2013.01);
(Continued)

(58) Field of Classification Search
None
See application file for complete search history.

(56) References Cited

U.S. PATENT DOCUMENTS 5,345,507 A * 9/1994 Herzberg .................. H04L 9/32
380/28

OTHER PUBLICATIONS

Birch, Jesper et al., "A programmable 800 Mbit/s CRC check/generator unit for LANs and MANS", Computer Networks and ISDN Systems 24, 1992, 109-118.
(Continued)

*Primary Examiner* — William J. Goodchild
(74) *Attorney, Agent, or Firm* — Murphy, Bilak & Homiller, PLLC

(57) ABSTRACT

A method (400) of generating a cryptographic checksum for a message M(x) is provided. The method is performed by a communication device, such as a sender or a receiver, and comprises calculating (405) the cryptographic checksum as a first function g of a division of a second function of M(x), $f(M(x))$, modulo a generator polynomial p(x) of degree n, $g(f(M(x)) \mod p(x))$. The generator polynomial is calculated (403) as $p(x)=(1-x) \cdot P_1(x)$, and P1(x) is a primitive polynomial of degree n−1. The primitive polynomial is selected (402), based on a first cryptographic key, from the set of primitive polynomials of degree n−1 over a Galois Field. By replacing a standard checksum with a cryptographic checksum, an efficient message authentication is provided. The proposed cryptographic checksum may be used for providing integrity assurance on the message, i.e., for detecting random and intentional message changes, with a known level of security. The proposed checksum is capable of detecting double-bit errors which may be introduced by a Turbo code decoder.

18 Claims, 5 Drawing Sheets

(51) Int. Cl.
H03M 13/09 (2006.01)
H03M 13/15 (2006.01)
(52) U.S. Cl.
CPC ........ *H03M 13/158* (2013.01); *H04L 9/3236* (2013.01); *H04L 2209/34* (2013.01)

(56) References Cited

OTHER PUBLICATIONS

Dubrova, Elena et al., "Cryptographically Secure CRC for Lightweight Message Authentication", International Association for Cryptologic Research, Jan. 15, 2015, 1-12.
Gao, Shuhong et al., "Tests and Constructions of Irreducible Polynomials over Finite Fields", Foundations of Computational Mathematics, 1997, 1-16.
Krawczyk, Hugo, "LFSR-based Hashing and Authentication", Advances in Cryptology (CRYPTO), 1994, 129-139.
Peterson, W. W. et al., "Cyclic Codes for Error Detection", Proceedings of the IRE, vol. 49, Issue: Jan. 1, 1961, 228-235.
Press, William H. et al., "Cyclic Redundancy and Other Checksums", Numerical Recipes—The Art of Scientific Computing, Third Edition, Chapter 22.4, 2007, 1168-1175.
Unknown, Author, "Cyclic redundancy check", Wikipedia, Apr. 29, 2015, 1-10.
Unknown, Author, "IEEE Standard for Local and metropolitan area networks—Part 15.4: Low-Rate Wireless Personal Area Networks (LR-WPANs)", IEEE Standard 802.15.1-2011, XP-002728593, Sep. 5, 2011, 1-47.
Zivkovic, Miodrag, "Generation of Primitive Binary Polynomials", International Conference on Algebra, Logic and Discrete Mathematics, Apr. 14-16, 1995, 1-5.

\* cited by examiner

GENERATING CRYPTOGRAPHIC CHECKSUMS

TECHNICAL FIELD

The invention relates to a method of a communication device for generating a cryptographic checksum, a corresponding computer program, a corresponding computer program product, and a checksum generator for generating a cryptographic checksum.

BACKGROUND

Current third generation (3G) and fourth generation (4G) $3^{rd}$ Generation Partnership Project (3GPP) mobile networks typically use encryption as well as authentication in the control plane, whereas the user plane is protected by encryption only. WiMAX and Wireless Local Area Networks (WLAN)/WiFi networks on the other hand use authentication also for the user plane.

A known way of protecting user plane messaging is to use authentication tags which are generated by applying keyed cryptographic hash functions to messages, such as keyed-Hash Message Authentication Codes (HMAC) or Cipher Block Chaining Message Authentication Codes (CBC-MAC). A cryptographic hash function is a hash function that generates a cryptographic hash value, also known as message digest, for an arbitrary block of data, such as a message, such that any accidental or intentional change to the message, i.e., an error or modification, will change the hash value, at least with a certain high probability. Accordingly, the message digest can be used for providing integrity assurance on the message.

A first problem with keyed cryptographic hash functions is that they are comparatively resource consuming, which hampers their use in constrained devices, i.e., devices with limited computing and battery resources such as Machine-to-Machine (M2M) and Internet-of-Things (IoT) types of devices. In addition, the increase in message length due to the message digest reduces the payload portion of the transmitted data and increases power consumption. A second problem is that in current state of the art, security cannot be assured by a formal/mathematical proof, at least not with a proof that is free from other cryptographic assumptions, e.g., assuming that the Advanced Encryption Standard (AES) or some other function is secure.

Some level of protection against random errors can be achieved by using Cyclic Redundancy Check (CRC) codes. CRC codes are a type of separable cyclic codes which are very resource-efficient and widely used in data communication and data storage for detecting burst errors. CRC processing can be efficiently implemented with Linear-Feedback Shift Registers (LFSRs). Common CRCs are (CRC-n means that a generator polynomial of degree n is used for encoding and decoding the CRC, where the degree is the largest coefficient of the CRC's generator polynomial):

CRC-16-CDMA2000: used in 3G mobile networks
CRC-CCITT: used in Bluetooth
CRC-24: used in LTE
CRC-32: used in Ethernet and High-Level Data Link Control (HDLC) protocols
CRC-40-GSM: used in GSM control channel.

A CRC with a generator polynomial of degree n is able to detect all burst errors of length less than or equal to n and any error which is not a multiple of the generator polynomial.

In applications requiring reliable and highly efficient information transfer over bandwidth- and/or latency-constrained communication links in the presence of noise, Forward Error Correction (FEC) codes are typically used. A message with an attached checksum, such as a CRC, is first encoded into a codeword of an FEC code before it is modulated and transmitted.

In Long Term Evolution (LTE) networks Turbo codes are frequently used as FEC codes. Since Turbo code decoding is based on probabilistic decisions, errors may be introduced into the message during the decoding process. A common type of error introduced by Turbo code decoders is double-bit errors, where the two flipped bits are not necessarily consecutive. Therefore, for communications relying on Turbo codes, e.g., as in LTE networks, it is important to detect, and preferably correct, double-bit errors introduced by the Turbo code decoding stage. For this reason, LTE uses types of CRCs which are able to detect double-bit errors, also known as two-bit errors, such as CRC-24.

While traditional CRC techniques are suitable for detecting random errors, they can easily be defeated by a malicious adversary. Since it is known to an adversary which generator polynomial is used by a certain CRC, he may easily craft a modified message which passes the CRC check at the receiver. This may, e.g., be achieved by adding to the original message an error which corresponds to a multiple of the generator polynomial.

A more resource efficient solution for providing data integrity in the user plane is to replace the conventional CRC by a cryptographically secure CRC, in the following also referred to as cryptographic CRC or cryptographic checksum. A cryptographic CRC has the same capability of detecting random errors as a traditional CRC, but is also capable of detecting, with high probability, any malicious error injected by an adversary.

A type of cryptographically secure CRC was proposed by Krawczyk [H. Krawczyk, "LFSR-based Hashing and Authentication", in "Advances in Cryptology—CRYPTO '94", Lecture Notes in Computer Science, Volume 839, Springer, 1994, pp. 129-139]. The proposed CRC requires an irreducible polynomial of degree n for generating the authentication tag, i.e., the CRC check bits. The basic idea is to let the CRC polynomial be a shared secret, known only to sender and receiver.

SUMMARY

It is an object of the invention to provide an improved alternative to the above techniques and prior art.

More specifically, it is an object of the invention to provide an improved authentication of messages. In particular, it is an object of the invention to provide an improved cryptographic checksum with a known level of security.

These and other objects of the invention are achieved by means of different aspects of the invention, as defined by the independent claims. Embodiments of the invention are characterized by the dependent claims.

According to a first aspect of the invention, a method of generating a cryptographic checksum for a message M(x) is provided. The method is performed by a communication device. The method comprises calculating the cryptographic checksum as a first function g of a division of a second function of M(x), $f(M(x))$, modulo a generator polynomial p(x) of degree n, $g(f(M(x)) \bmod p(x))$. The generator polynomial is calculated as $p(x)=(1-x)\cdot p_1(x)$, where $p_1(x)$ is a primitive polynomial of degree n−1. The primitive polynomial is selected, based on a first cryptographic key, from the set of primitive polynomials of degree n−1 over a Galois Field, in particular GF(2).

According to a second aspect of the invention, a computer program is provided. The computer program comprises computer-executable instructions for causing a device to perform the method according to an embodiment of the first aspect of the invention, when the computer-executable instructions are executed on a processing unit comprised in the device.

According to a third aspect of the invention, a computer program product is provided. The computer program product comprises a computer-readable storage medium which has the computer program according to the second aspect of the invention embodied therein.

According to a fourth aspect of the invention, a checksum generator for generating a cryptographic checksum for a message M(x) is provided. The checksum generator comprises means which are configured for calculating the cryptographic checksum as a first function g of a division of a second function of M(x), ƒ(M(x)), modulo a generator polynomial p(x) of degree n, g(ƒ(M(x))mod p(x)). The generator polynomial is calculated as p(x)=(1−x)·p₁(x), where $p_1(x)$ is a primitive polynomial of degree n−1. The primitive polynomial is selected, based on a first cryptographic key, from the set of primitive polynomials of degree n−1 over a Galois Field, in particular GF(2). The checksum generator may, e.g., be comprised in a communication device.

Throughout this disclosure, a communication device may, e.g., be a sender device, a receiver device, a mobile terminal, a User Equipment (UE), a mobile phone, a smartphone, a tablet, a computer, a node of a Radio Access Network (RAN), or the like.

The invention makes use of an understanding that an efficient authentication of a message may be provided by replacing the standard checksum, such as a CRC, with a cryptographic checksum which is based on a generator polynomial which is a product of a primitive polynomial and a fixed polynomial (1−x). As is known in the art, primitive polynomials are reducible and have a non-zero constant term. The proposed cryptographic checksum may be used for providing integrity assurance on the message, i.e., for detecting random and intentional message changes, with a known level of security which is derived further below. Advantageously, the proposed checksum is guaranteed to detect double-bit errors, which may be introduced by a Turbo code decoder, up to a message length of $2^{n-1}-1$ bits [see, e.g., W. H. Press, S. A. Teukolsky, W. T. Vetterling, and B. P. Flannery, "Section 22.4 Cyclic Redundancy and Other Checksums" in "Numerical Recipes: The Art of Scientific Computing (3rd ed.)", New York: Cambridge University Press]. Since the maximum allowed transport block size for data in LTE is 6114 bits, a checksum of order 24, such as CRC-24, is capable of detecting all double-bit errors in messages. The proposed checksum is also capable of detecting any single-bit error and any error in the odd number of bits.

In the present context, a message is binary-coded information which frequently is cast into a certain format. The format may be dictated by a protocol to which the message relates. Typically, the message comprises a header and payload, and the cryptographic checksum is preferably generated for the entire message, i.e., header and payload.

Embodiments of the invention are advantageous over the prior art in that, by replacing a conventional CRC with a cryptographic checksum which has the same capability of detecting random errors as the traditional CRC while additionally providing integrity assurance for a message, the message format is not changed. In particular, the length of the message is not increased, in contrast to known solutions which are based on adding additional MACs to the message. Generating the proposed generator polynomial requires testing for primitivity, with a computational complexity of order $n^3$ bit operations [see, e.g., M. ivković, "Generation of primitive binary polynomials", International Conference on Algebra, Logic and Discrete Mathematics, Apr. 14-16, 1995, Niš], which is comparable to the computational complexity of tests for irreducibility [see, e.g., S. Gao and D. Panario, "Tests and Constructions of Irreducible Polynomials over Finite Fields" in Foundations of Computational Mathematics, F. Cucker and M. Shub (Eds.), Springer, 1997, pp. 346-361].

Note that, in the present context, selecting the primitive polynomial may be controlled by means of a probability distribution for the primitive polynomial. Such a probability distribution may effectively limit the set of available polynomials. In practice, maintaining a database of only a subset of all primitive polynomials of degree n−1 over a Galois Fields amounts to enforcing a probability distribution which has zero probability for the polynomials which are not contained in the database.

According to an embodiment of the invention, the method further comprises selecting the primitive polynomial and calculating the generator polynomial by the communication device. In other words, in a scenario of two communication devices which are engaged in a communication session, such as a sender and a receiver, the primitive polynomial may be selected by each communication device, based on a deterministic scheme involving a shared secret. The generator polynomial is calculated by each communication device based on the primitive polynomial which it has selected.

Alternatively, the primitive polynomial, or information describing how to generate the primitive polynomial, may be received by the communication device, and the generator polynomial is calculated based on the received primitive polynomial or the received information describing how to generate the primitive polynomial. For instance, one of the communication devices, e.g., the sender, may select a primitive polynomial and transmit the primitive polynomial, or information describing how to generate the primitive polynomial, to the receiver. The generator polynomial is then calculated by each communication device based on the primitive polynomial selected by the sender. The primitive polynomial may also be selected by a third party, i.e., a network node which is not involved in the communication session between the two communication devices, and the primitive polynomial or the information describing how to generate the primitive polynomial is then distributed to the two communication devices. The third party may, e.g., be a key server or an Authentication, Authorization, and Accounting, (AAA) server in a communications network.

As yet a further alternative, the generator polynomial, or information describing the generator polynomial, may be received by the communication device. For instance, one of the communication devices, e.g., the sender, may calculate the generator polynomial, either based on a primitive polynomial which it has selected or based on a received primitive polynomial, and transmit the generator polynomial or information describing how to generate the generator polynomial to the receiver. The generator polynomial may also be calculated by a third party, i.e., a network node which is not involved in the communication session between the two communication devices, such as a key server or an AAA server in a communications network, and the generator polynomial or the information describing how to generate the generator polynomial is then distributed to the two communication devices.

According to an embodiment of the invention, the primitive polynomial is pseudo-randomly selected. Throughout this disclosure, pseudo-random selection is understood to be a process which appears random, i.e., which results in sequences of primitive polynomials which exhibit statistical randomness or computational randomness, but which in fact relies on deterministic rules. Statistical randomness means that the probability distribution of the generated primitive polynomials is close, in some metric, to the uniform distribution over the set of all primitive polynomials. Computational randomness means that no efficient algorithm is able to distinguish that the probability distribution of the generated primitive polynomials, in some metric, from the uniform distribution over the set of all primitive polynomials.

According to an embodiment of the invention, the method further comprises pseudo-randomly generating a pad s of length n, wherein the first function comprises an addition with the pad. Adding a pseudo-randomly generated pad is advantageous in that the linear transformation of generating a cryptographic checksum by means of a hash function is converted into an affine transformation. In absence of the pad, an adversary may successfully inject an all-zero message. Optionally, the pad may be pseudo-randomly generated. Further optionally, the pad may be generated based on a second cryptographic key, which may be equal to, or different from, the first cryptographic key.

According to an embodiment of the invention, the primitive polynomial is selected additionally based on information which is specific for the message. That is, the primitive polynomial is selected based on message specific information in a way which is only known to the sender and the receiver of the message while appearing random to an adversary. The message specific information may, e.g., comprise any one or a combination of a message sequence number, a message identifier, a time stamp comprised in the message, or the like. Thus note that the message specific information does not need to be secret, only the way in which it effects the selection of the primitive polynomial needs to be secret.

According to an embodiment of the invention, the method is performed by a sender device. The method comprises acquiring the message, generating a cryptographic checksum for the message, appending the generated cryptographic checksum to the message, encoding the message and the appended cryptographic checksum into a codeword of an FEC code, and transmitting the FEC codeword.

According to an embodiment of the invention, the encoding the message and the appended cryptographic checksum encoded into a codeword of an FEC code comprises generating one or more check bits of the FEC code based on the message and the appended cryptographic checksum, and appending the generated FEC check bits to the message and the appended cryptographic checksum. In this case, the check bits can be separated from the FEC codeword at the receiver. Such FEC codes are commonly referred to as separable codes.

According to another embodiment of the invention, the method is performed by a receiver device. The method comprises receiving a codeword of an FEC code, extracting the message and an appended first cryptographic checksum from the FEC codeword, generating a second cryptographic checksum for the message, and verifying if the first cryptographic checksum and the second cryptographic checksum are identical. If not, the integrity of the message could not be established. That is, the message has been modified, either intentionally or accidentally. The message and the appended first cryptographic checksum are extracted from the FEC codeword by decoding the FEC codeword.

According to an embodiment of the invention, the FEC codeword comprises the message, the appended first cryptographic checksum, and one or more appended check bits of the FEC code, and the extracting the message and an appended first cryptographic checksum from the FEC codeword comprises correcting the message and the appended first cryptographic checksum based on the appended FEC check bits. This is the case for separable FEC codes.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
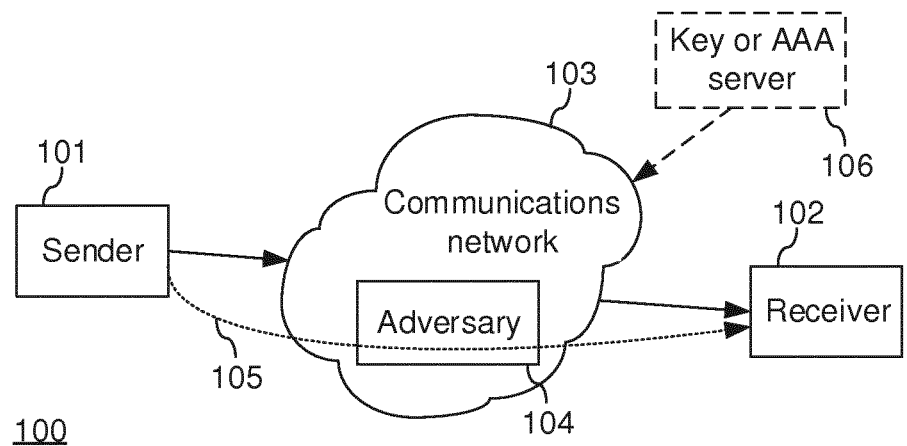
FIG. 1 shows a communication system.

In FIG. 1, a communication system 100 is illustrated which comprises two communication devices, a sender device 101 and a receiver device 102, throughout this disclosure referred to as sender and receiver, respectively, which are configured for communicating over a communications network 103. In particular, sender 101 is configured for transmitting a message 105, and receiver 102 is configured for receiving message 105. Preferably, communication devices 101 and 102 are configured for transmitting and receiving messages. Sender 101 and receiver 102 may be any type of device capable of effecting communications over communications network 103, such as computers, mobile terminals, User Equipments (UEs), M2M/IoT type of devices, or nodes of a Radio Access Network (RAN), such as gateways, Radio Network Controllers (RNCs), Radio Base Stations (RBSs), NodeBs, or eNodeBs. Communications network 103 may be any one, or a combination of, a wired or wireless network, e.g., a RAN such as GSM, UMTS, LTE, a WLAN/WiFi network, an Ethernet network, a corporate network, the Internet, or the like.

Message 105 which is transmitted from sender 101 to receiver 102 via communications network 103 may be subject to modifications, either random/unintentional or intentional/malicious. Random modifications may, e.g., be caused by burst errors or non-adjacent t-bit errors (t=2), occurring during transmission over an air interface of a wireless network of communications network 103 or by some FEC decoder such as a Turbo code decoder. Malicious modifications on the other hand may originate from an adversary 104 which is also illustrated in FIG. 1. Adversary 104 may intercept message 105 transmitted by sender 101 and re-transmit a modified copy of the message to receiver 102. Adversary 104 may also attempt to generate new messages without relying on modifications of messages received from sender 101. Typically, the intent of adversary 104 is to inject malicious messages into receiver 102, in particular a network interface, operating system, or application, of receiver 102.

Figure 2:
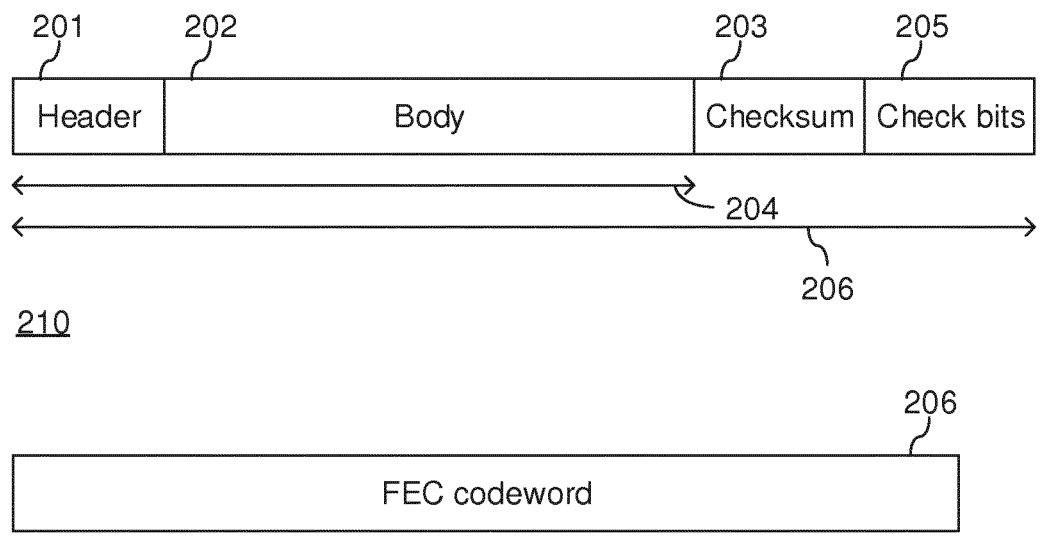
FIG. 2 shows a codeword.

It is known in the art to detect random modifications of message 105 by means of an integrity assurance on message 105. This may be achieved by providing message 105 with a checksum, such as a CRC, as is illustrated in FIG. 2. The usage of checksums in accordance with embodiments of the invention is throughout this disclosure described in connection with Forward Error Correction (FEC) codes, which are used for controlling errors in data transmission over unreliable or noisy communication channels. FEC codes are, e.g., used in LTE networks. The idea behind FEC is that sender 101 encodes a message in a redundant way by using an error-correcting code, allowing receiver 102 to detect and correct certain errors. The capability of detecting different types of errors depends on the type of FEC code employed. Note, however, that the invention may be useful also in scenarios which do not rely on FEC. For example, this may be the case if a channel between a sender and a receiver for some reason has a tendency to introduce double-bit errors, akin to what may occur in an FEC decoder, as discussed above.

To this end, a checksum 203, such as a CRC, is generated for a message 204, which in FIG. 2 is illustrated as comprising a header 201 and a body 202 carrying payload, and appended to message 204. Message 204 and the appended checksum 203 are subsequently encoded into an FEC codeword 206. If an FEC algorithm with separable FEC codes is used, as is illustrated in the upper part 210 of FIG. 2, a number of FEC check bits 205 are generated based on the FEC algorithm and appended to message 204 and checksum 203, resulting in an FEC codeword 206 with separable check bits 205. As an alternative, illustrated in the lower part 220 of FIG. 2, one may envisage FEC algorithms which do not use separable FEC codes. In the latter case, message 204 and checksum 203 are encoded into an FEC codeword 206 which has an increased length as compared to the combined length of message 204 and checksum 203, to provide for redundant bits. Codeword 206 (corresponding to, or carried in, message 105 in FIG. 1) is then transmitted to receiver 102 where the integrity of message 204 is verified, as is described in the following with reference to FIG. 3, which shows a block diagram 300 illustrating the sender side (left in FIG. 3) and the receiver side (right in FIG. 3), corresponding to sender 101 and receiver 102, respectively, of FIG. 1.

At sender 101, message 204 which is to be transmitted to receiver 102 is acquired, e.g., received from a higher layer of a protocol stack of sender 101, and fed into an algorithm 301 configured for calculating a first checksum (CS in FIG. 3) 203, in particular a CRC. In addition to message 204, checksum algorithm 301 receives a shared secret as input, e.g., a cryptographic key, and generates first checksum 203 as output. Optionally, checksum algorithm 301 may additionally receive an Initialization Value (IV) as input, based on which first checksum 203 is generated. The IV may be a separate input to checksum algorithm 301, or it may be input as part of message 204, e.g., by prepending or appending it to message 204. Then, message 204 and checksum 203 are combined, by appending checksum 203 to message 204 before they are encoded, by an FEC encoding algorithm 311, into an FEC codeword 206 which subsequently is transmitted as message 105 to receiver 102, e.g., via communications network 103.

At receiver 102, an FEC codeword 216 is received and fed into an FEC decoding algorithm 312, which corresponds to FEC encoder 311 and is capable of detecting and correcting burst errors introduced during transmission of FEC codeword 206 originating from sender 101. In absence of any transmission errors, FEC codeword 216 received by receiver 102 is identical to FEC codeword 206 transmitted by sender 101. An output from FEC decoder 312 is a message 214 and its checksum 213 (CS' in FIG. 3). Note that message 214 and checksum 213 may be different from message 204 and checksum 203, respectively, fed into FEC encoder 311 on the sender side, owing to errors introduced by FEC decoder 312. Such errors may be introduced by Turbo code decoders which are frequently used in LTE, since Turbo code decoding is based on probabilistic decisions. A common type of error introduced by Turbo code decoders is double-bit errors, where the two flipped bits are not necessarily consecutive.

Message 314 is fed into checksum algorithm 301 which is identical to checksum algorithm 301 of sender 101 and which generates a second checksum 223 (CS" in FIG. 3) based on message 314 and further based on a shared secret which is identical to the shared secret used by sender 101. Optionally, checksum algorithm 301 may additionally receive an IV as input which is identical to the IV used by sender 101. Then, the integrity of message 314 is verified by feeding the second checksum 223 into a comparator 305 and comparing it to the first checksum 213 extracted from the received codeword 206. The result of the comparison is made available by comparator 305 for further use, e.g., for a higher layer of a communication stack of receiver 102, and indicates whether the first checksum 213 and the second checksum 223 are identical or not. For instance, the result output by comparator 305 may be a Boolean value, wherein a high value (Boolean "1") indicates that the two checksums are identical and a low value (Boolean "0") indicates that the two checksums differ, or vice versa. If identical, the integrity of message 304 may be assumed, i.e., that message 214 received by receiver 102 is identical to message 204 transmitted by sender 101. By verifying the integrity of message 214, it can be inferred with a certain probability that message 204 has not been modified during transmission 105.

Known checksums, in particular CRCs which are cryptographic hash functions like HMAC or CBC-MAC, are designed for detecting random modifications of a message. More specifically, a CRC with a generator polynomial p(x) of degree n is capable of detecting all burst errors of length less than or equal to n. Furthermore, a CRC will detect any error which is not a multiple of its generator polynomial p(x). Encoding and decoding of CRCs can efficiently be implemented by hardware, using LFSRs, and software.

For encoding at sender 101, message M(x) 204 is typically first multiplied by $x^n$ and then divided modulo generator polynomial p(x). The polynomial coefficients of the remainder, $$r(x) = M(x) \cdot x^n \bmod p(x) \qquad (1),$$

constitute the CRC checksum 203, i.e., the message digest, and are added to the data bits, $M(x) \cdot x^n$, to form the combination of message 204 and checksum 203. Throughout this disclosure, "·" is a finite GF multiplication (which for the finite GF(2) is equivalent to the Boolean AND) operation and "mod" is the remainder of polynomial modulo division in the finite field. Note that multiplication by $x^n$ shifts message M(x) 204 by n bits. That is, message M(x) 204 is shifted before combining with CRC checksum 203. As a result, the message bits are separable from the checksum bits. Then, message 204 and checksum 203 are encoded into an FEC codeword 206 by FEC encoder 311, which operates in accordance with a certain FEC algorithm. In LTE, Turbo codes are commonly used.

For decoding at receiver 102, the data bits $M'(x) \cdot x^n$ received in FEC codeword 216 are first fed into FEC decoder 312, which operates in correspondence with FEC encoder 311, thereby extracting message 214 and checksum 213, which subsequently are divided modulo generator polynomial p(x). The polynomial coefficients of the resulting remainder, checksum 223, $$r'(x) = M'(x) \cdot x^n \bmod p(x) \qquad (2),$$

are compared with the check bits r(x) 213 (CS') received with codeword 206. If no error has occurred, i.e., message 204 has not been modified during transmission 105 and no double-bit errors haven been introduced by FEC decoder 312, the remainder r'(x) is the same as the received remainder r(x). A disagreement indicates an error, either a flipped bit in message 203, a flipped bit in checksum 203, or both.

While traditional CRC techniques are useful for detecting random modifications or errors, adversary 104 may easily craft a modification to a message transmitted by sender 101 which passes the CRC check at receiver 102, since generator polynomial p(x) utilized by checksum algorithm 301 is not a secret known to sender 101 and receiver 102 only. For instance, adversary 104 may add to the transmitted message M(x) 204 an error e(x) corresponding to a polynomial which is a multiple of generator polynomial p(x), such that e(x) mod p(x)=0. Moreover, adversary 104 may simply replace message 204 transmitted by sender 101 by a different message 304, presumably with malicious content, encode it using the same checksum algorithm 301 as sender 101, and transmit it to receiver 102 where it passes the integrity check.

A resource efficient solution for providing data integrity, and in particular in the user plane, is to replace the conventional CRC by a cryptographically secure CRC, which has the same capability of detecting random errors as a traditional CRC but which is also capable of detecting, with high probability, any intentional or malicious modification. An advantage of using a cryptographically secure CRC of the same size as a traditional CRC is that existing protocol stacks can be extended to support message authentication without requiring to redesign the entire protocol stack in order to account for a change in message size.

The cryptographically secure CRC proposed by Krawczyk is based on the idea to let the generator polynomial be a shared secret, known only to sender 101 and receiver 102. Thereby, adversary 104 cannot design messages so as to pass the integrity check at receiver 102. This works satisfactorily from a security point of view, but the generator polynomial proposed by Krawczyk does not allow detecting double-bit errors.

The embodiments of the invention which are described in the following are advantageous in that the integrity of message 105 transmitted from sender 101 to receiver 102 can be verified by means of a cryptographic checksum which is of the same size as a conventional CRC but which is capable of detecting intentional of malicious modifications with a high probability in addition to random errors, to which conventional CRCs are limited. In contrast to the cryptographic checksum proposed by Krawczyk, embodiments of the invention are further advantageous in that the proposed generator polynomials have the capability of detecting double-bit errors which may be introduced by FEC decoder 312.

Figure 3:
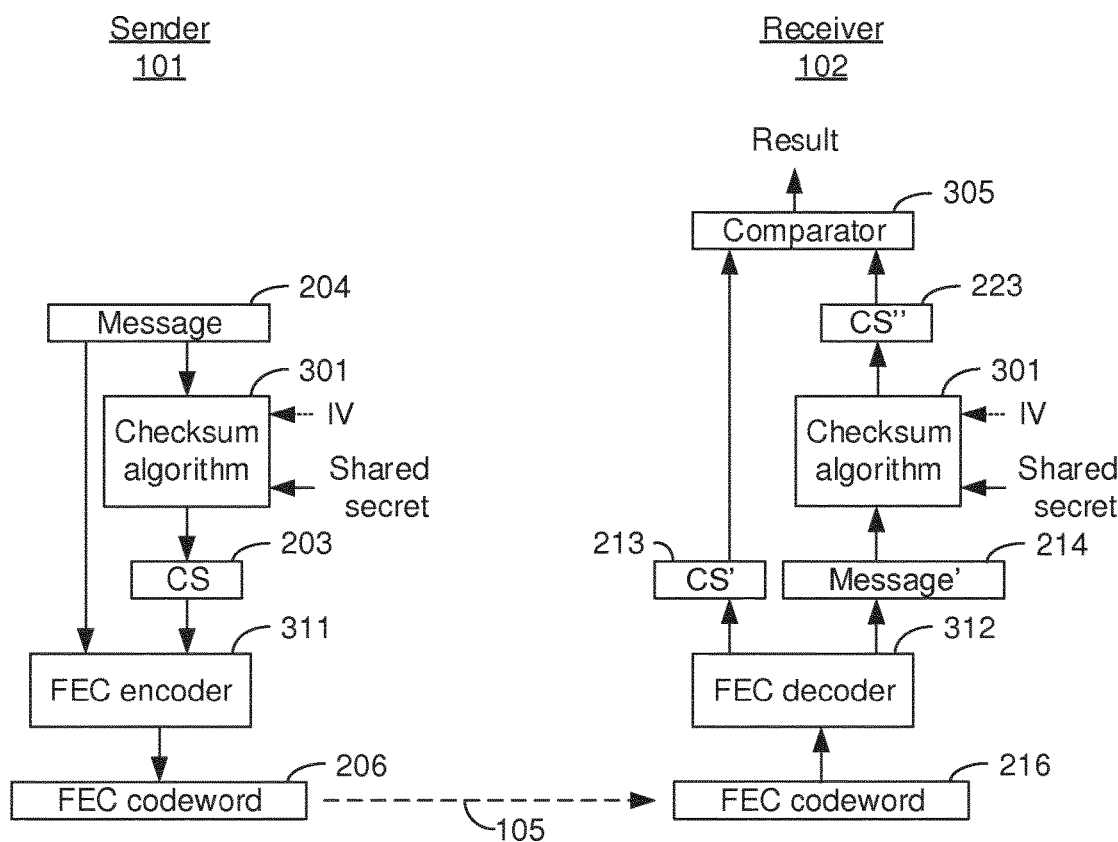
FIG. 3 shows a block diagram illustrating message authentication.

To this end, embodiments of the invention utilize a cryptographic checksum which replaces the conventional checksum 203, such as a CRC, illustrated in FIGS. 2 and 3. Note that message 204, or parts thereof, e.g., body 202, may also be encrypted in some embodiments of the invention. In such case, receiver 102 may first decrypt the message, or parts of the message, before performing integrity verification. Alternatively, at least part of the decryption process may be interleaved with the checksum verification. As yet a further alternative, there may be no need for receiver 102 to first decrypt the received message. The need to first decrypt the received message at receiver 102 is dependent on the order of processing at sender 101. For instance, if message encryption is applied at sender 101 after checksum 203 is generated and appended to message 204, receiver 102 typically first needs to decrypt the at least parts of received codeword 216. On the other hand, if sender 101 first encrypts message 204 before computing checksum 203 over the encrypted message, then receiver 102 may postpone decryption until after checksum 223 has been calculated and the integrity of the received encrypted message has been verified. Throughout this disclosure, unless otherwise noted, we assume that decryption is performed as required.

Accordingly, checksum algorithm 301 which is used for generating cryptographically secure checksums at sender 101 (CS in FIG. 3) and receiver 102 (CS" in FIG. 3), respectively, is modified in comparison with that proposed by Krawczyk as is described in the following.

Checksum algorithm 301 is dependent on a hash function $h_p(M)$ for generating a cryptographic checksum 203 for a message M(x) 204. It comprises calculating cryptographic checksum t(M) 203 as a first function g of a division of a second function $f$ of M(x), $f$(M(x)), modulo p(x), i.e., $$t(M)=g(f(M(x))\bmod p(x)) \quad (3),$$

where $$h_p(M)=f(M(x))\bmod p(x) \quad (4)$$

is the hash function. The generator polynomial is of the form $$p(x)=(1-x) \cdot p_1(x) \quad (5),$$

where $p_1(x)$ is a primitive polynomial of degree n−1 which is selected from the set of primitive polynomials over a Galois Field, in particular the Galois field of order 2, GF(2). The primitive polynomial $p_1(x)$ may be selected based on a first cryptographic key, i.e., a shared secret which is known to sender 101 and receiver 102. The shared secret may, e.g., be established by public key techniques or symmetric techniques supported by Subscriber Identity Modules (SIM), Universal SIMs (USIM), or the like, as is known in the art. The selection of the primitive polynomial $p_1(x)$ and the calculation of the generator polynomial p(x) according to Eq. (4) may be performed by sender 101 and receiver 102, e.g., in checksum algorithm 301.

As an alternative, sender 101 and/or receiver 102 may also be configured for receiving the primitive polynomial $p_1(x)$, or information describing how to generate the primitive polynomial $p_1(x)$, and calculating the generator polynomial p(x) based on the received primitive polynomial $p_1(x)$ or the received information describing how to generate the primitive polynomial $p_1(x)$. For instance, sender 101 may be configured for selecting the primitive polynomial $p_1(x)$, calculating the generator polynomial p(x), and transmitting the primitive polynomial $p_1(x)$, or information describing how to generate the primitive polynomial $p_1(x)$, to receiver 102. Correspondingly, receiver 102 may be configured for receiving the primitive polynomial $p_1(x)$, or information describing how to generate the primitive polynomial $p_1(x)$, and calculating the generator polynomial p(x) based on the received primitive polynomial $p_1(x)$ or the received information describing how to generate the primitive polynomial $p_1(x)$. Alternatively, both sender 101 and receiver 102 may be configured for receiving the primitive polynomial $p_1(x)$, or information describing how to generate the primitive polynomial $p_1(x)$, from a third party, such as a key or AAA server 106, or the like, and calculating the generator polynomial p(x) based on the received primitive polynomial $p_1(x)$ or the received information describing how to generate the primitive polynomial $p_1(x)$. It will be appreciated that, in this case, the received primitive polynomial $p_1(x)$, or the received information describing how to generate the primitive polynomial $p_1(x)$, is used as input to checksum algorithm 301, instead of the shared secret and the optional IV.

As yet another alternative, sender 101 and/or receiver 102 may also be configured for receiving the generator polynomial p(x) or information describing how to generate the generator polynomial p(x). For instance, sender 101 may be configured for selecting the primitive polynomial $p_1(x)$, calculating the generator polynomial p(x), and transmitting the generator polynomial p(x), or information describing how to generate the generator polynomial p(x), to receiver 102. Correspondingly, receiver 102 may be configured for receiving the generator polynomial p(x), or information describing how to generate the generator polynomial p(x). Alternatively, both sender 101 and receiver 102 may be configured for receiving the generator polynomial p(x) or information describing how to generate the generator polynomial p(x) from a third party, such as key or AAA server 106, or the like. It will be appreciated that, in this case, the received generator polynomial p(x) or the received information describing how to generate the generator polynomial p(x) is used as input to checksum algorithm 301, instead of the shared secret and the optional IV.

Information describing how to generate the primitive polynomial $p_1(x)$ or the generator polynomial p(x) may, e.g., comprise an index into a list of primitive polynomials or generator polynomials, which list is known to both sender 101 and receiver 102, or the coefficients of the primitive polynomial $p_1(x)$ or the generator polynomial p(x), respectively. Alternatively, the information describing how to generate the primitive polynomial may be a seed which is used as input to a deterministic algorithm which generates a primitive polynomial in dependence of the seed. For example, the seed may be an arbitrary polynomial and the deterministic algorithm may operate by testing, in lexicographic order starting from the seed input, consecutive polynomials until a primitive polynomial is found. To test if a certain polynomial is primitive or not is well known in the art [see, e.g., ivković, "Generation of primitive binary polynomials", International Conference on Algebra, Logic and Discrete Mathematics, Apr. 14-16, 1995, Niš].

For instance, if the primitive polynomial $p_1(x)$ of degree n−1 is represented as $$p_1(x)=\Sigma_{i=0}^{n-1} c_i x^i \quad (6),$$

the information describing how to generate the primitive polynomial $p_1(x)$ may comprise the set of coefficients $\{c_i\}$, where $c_i=0$ or 1, for all i=0, ..., n−1, for GF(2).

Correspondingly, if the generator polynomial p(x) of degree n is represented as $$p(x)=\Sigma_{i=0}^{n} c'_i x^i \quad (7),$$

the information describing how to generate the generator polynomial p(x) may comprise the set of coefficients $\{c'_i\}$, where $c'_i=0$ or 1, for all i=0, ..., n, for GF(2).

The primitive polynomial $p_1(x)$, the generator polynomial p(x), or information describing how to generate the primitive polynomial $p_1(x)$ or the generator polynomial p(x), respectively, may be provided to devices involved in a communication session, such as sender 101 and/or receiver 102, during a handshake procedure which is performed as part of an initialization process of the communication session. For example, if an Authentication and Key Agreement (AKA) procedure, or the like, is utilized as part of the initialization process, the key produced by the AKA may be used as the aforementioned first cryptographic key, and may further be used as input to a deterministic algorithm generating a primitive polynomial as describe above. Alternatively, the first cryptographic key may be used as an index into a pre-computed table of suitable primitive polynomials.

Further optionally, the first function g may comprise an addition with a pad s of length n, i.e., $$g(h_p(M))=h_p(M)+s \quad (8),$$

where "+" is the Boolean bitwise XOR operation. Pad s may be generated pseudo-randomly, e.g., based on a second cryptographic key which may be identical to, or different from, the first cryptographic key. The first and/or the second cryptographic key may be generated from a third cryptographic key, e.g., by generating pseudo-random bit sequence from the third cryptographic key and some information known to sender 101 and receiver 102, and selecting a portion of the generated bit sequence to be the first cryptographic key and the remaining bits of the bit sequence to be the second cryptographic key. The addition of the random pad s is advantageous in that the linear transformation of generating a cryptographic checksum by means of hash function $h_p(M)$, i.e., $h_p(A)+h_p(B)=h_p(A+B)$, is converted into an affine transformation, $h_p(M)+s$. In absence of the pad, $h_p(0)=0$, irrespective of the generator polynomial used for the hash function, enabling an adversary to inject an all-zero message. Note that if encryption using a stream cipher is applied at sender 101, pad s may be provided by the encryption function, thus "interleaving" encryption and integrity processing. In this case, receiver 102 may either (i) first remove pad s by decryption and then treat only $h_p(M)$ as checksum 213, or (ii) not remove pad s and rather treat $h_p(M)+s$ as checksum 213.

The pad used in embodiments of the invention is similar to the well-known one-time pad introduced by Vernam in the early 1900's. In the Vernam cipher, the message was combined bit-by-bit with the pad using the Boolean XOR operation. In embodiments of the invention, the pad is combined with the cryptographic checksum in an analogous fashion.

In the following, the security of the proposed family hash functions for calculating cryptographic checksums in accordance with embodiments of the invention is analyzed and compared to the cryptographic checksums akin to Krawczyk.

We consider an (m, n)-family of cryptographically secure hash functions which is defined as follows. For any message $M(x)$ of binary length m and for each generator polynomial $p(x)$ according to Eq. (4), wherein $p_1(x)$ is a primitive polynomial of degree n−1 over a Galois Field, a hash function $h_p$ is defined as the binary coefficients of the polynomial $$h_p(M)=M(x)\cdot x^n \bmod p(x) \quad (9).$$

In order to compute the authentication tag, i.e., the message digest or cryptographically secure checksum, $$t(M)=h_p(M)+s \quad (10),$$

a primitive polynomial $p_1(x)$ is generated, preferably pseudo-randomly, the generator polynomial $p(x)$ is formed according to Eq. (4), hash function $h_p$ is evaluated, and a pseudo-randomly generated pad s is added, either explicitly or as part of an encryption process. Note that generating the primitive polynomial $p_1(x)$ either requires to run a test for primitivity for each polynomial pseudo-randomly selected from the set of all polynomials of degree n−1 over a Galois Field, or to pseudo-randomly draw each primitive polynomial $p_1(x)$ from a database comprising a set of, preferably all, primitive polynomials of order n−1 over a Galois Field.

For the sake of analyzing the security of the proposed family of hash functions, it is assumed that adversary 104 succeeds in breaking the authentication if, after seeing $M(x)$ and t, adversary 104 can find a message $M'(x) \neq M(x)$ such that t'=t. It is assumed here that adversary 104 knows the (m, n)-family of hash functions, but not the particular hash function $h_p$ and the pad s which are used for authenticating a particular message.

The analysis is carried out by considering the distribution of CRCs over all messages of a given length. Note that a worst-case scenario is considered here, i.e., it is assumed that adversary 104 will maximize his chances by trying to design checksums and we assume adversary 104 knows (and chooses) those message(s) which maximize the probability of success. Thus, probability of success will depend on the maximum probability that two different messages M and M' will have identical checksums t, calculated according to Eq. (10), since this means that adversary 104 can replace a message transmitted by sender 101 with another message without being detected, i.e., passing the integrity check at receiver 102. That is, we look for $$\max_{M,M'} \Pr[h_p(M)=h_p(M')] \quad (11),$$

where the maximum is taken over all distinct m-bit messages M and M', and the probability Pr is taken over random choices of generator polynomial $p(x)$, according to Eq. (4), defining the hash function. Note that the presence of the pad s does not affect the probability, since $h_p(M)+s=h_p(M')+s$ if, and only if, $h_p(M)=h_p(M')$. Note further that the probability is a statistical quantity, and the optimal strategy to predict a random event is to make predictions according to the statistical distribution of the event. For example, predicting whether a coin-flip (of a hypothetical, perfect coin) comes up heads or tails cannot be done with success greater than ½, no matter what resources are available. Therefore, Eq. (11) leads to an upper bound of any adversary's probability of success, no matter what computational resources the adversary may have at its disposal.

According to Theorem 1 (see Appendix), for any value of m and n, and for any message M, no adversary can succeed in breaking the authentication with the cryptographic checksum based on a randomly selected generator polynomial with probability larger than $$\varepsilon \leq (m+n-1)/\varphi(2^{n-1}-1) \quad (12),$$

where $\varphi$ is the well-known Euler totient function. The probability $\varepsilon$ is called the collision probability. If $2^{n-1}-1$ is prime, Eq. (12) reduces to $$\varepsilon \leq (m+n-1)/(2^{n-1}-2) \quad (13).$$

For the case when $2^{n-1}-1$ is not prime, Eq. (12) can be approximated as $$\varepsilon \leq (m+n-1)/2^{n-2} \quad (14).$$

For comparison, the collision probability for the irreducible generator polynomials akin to Krawczyk is given $$\varepsilon_{Kr} \leq (m+n)/2^{n-1} \quad (15).$$

As one can see, for the case of $2^{n-1}-1$ being prime (which holds, e.g., for n=32), the proposed cryptographically secure CRC has approximately the same collision probability (Eq. (13)) as the cryptographically secure CRC of Krawczyk (Eq. (15)), and thus provides similar security.

For instance, for n=32 and m=6114, the collision probability for embodiments of the invention is $\varepsilon=2.8615\cdot10^{-6}$ (Eq. (13)), whereas the collision probability for the cryptographically secure CRC akin to Krawczyk is $\varepsilon_{Kr}=2.8620\cdot10^{-6}$ (Eq. (15)). In addition, the presented cryptographically secure CRC can detect all double-bit errors for messages of size up to $2^{n-1}-1$ bits, which is not the case for the cryptographically secure CRC of Krawczyk.

Note that while the security analysis presented herein is based on the assumption of uniformly random parameters, e.g., randomly selected polynomials, these parameters are in practice generated pseudo-randomly. This distinction is, however, not of importance since pseudo-random generators are known which produce an output distribution which in practice cannot be distinguished from a uniform distribution. Thus, an adversary cannot exploit these differences in distributions.

Embodiments of the invention are based on an, for adversary 104, unpredictable change of at least one of generator polynomial $p(x)$ and pad s in a fashion which is deterministic for sender 101 and receiver 102. That is, the change of the generator polynomial p(x) and/or the pad s has to be synchronized between sender 101 and receiver 102.

The shared secret based on which the primitive polynomial is pseudo-randomly selected, i.e., the first cryptographic key, is intended to make the output of checksum algorithm 301 unpredictable for adversary 104, but checksum algorithm 301 may optionally select the primitive polynomial $p_1(x)$ based on some (non-secret) message dependent data, such as a sequence number of the message or some other unique information in the message, e.g., a time stamp, a message identifier, or a random number. Such additional information may, e.g., be carried in header 201 of message 204.

In general, it may not be required to compute a new generator polynomial for each message, but it suffices to generate the generator polynomial at the beginning of a new session between sender 101 and receiver 102 and keep it fixed for all messages which are exchanged between sender 101 and receiver 102 during the session. The pad, however, then has to be changed for each message and may be changed dependent on message dependent data, i.e., information which is specific for the message.

Figure 4:
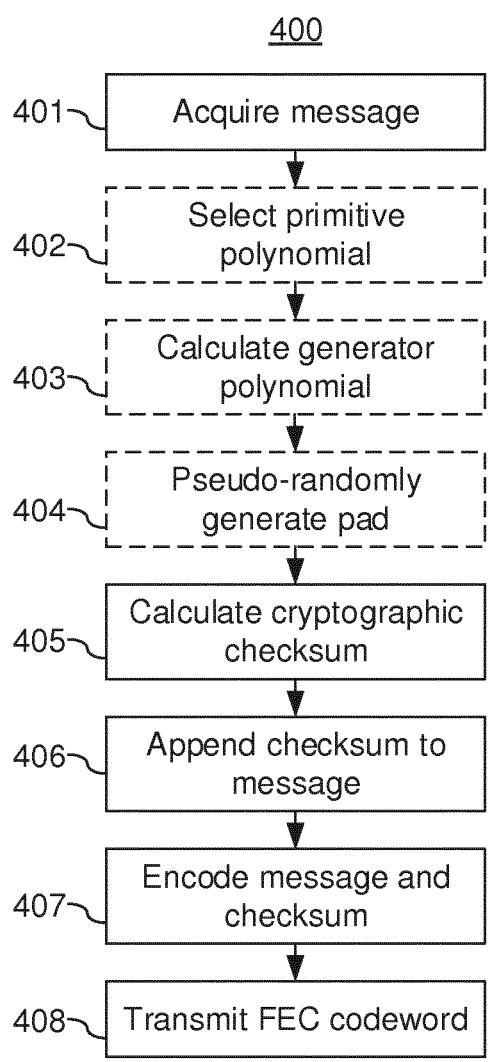
FIG. 4 shows a flow chart for a method of a sender, in accordance with an embodiment of the invention.

In FIG. 4, an embodiment 400 of the method of a sender device for authenticating a message is illustrated. An embodiment of method 400 may, e.g., be performed by sender 101. Method 400 comprises acquiring 401 the message, e.g., from a higher layer of a communication stack of sender 101 or an application being executed by sender 101, generating a cryptographic checksum for the message, appending 406 the generated cryptographic checksum to the message, encoding 407 the message and the appended cryptographic checksum into a codeword of an FEC code, and transmitting 408 the FEC codeword.

More specifically, generating the cryptographic checksum comprises calculating 405 the cryptographic checksum as a first function g of a division of a second function of M(x), $f(M(x))$, modulo a generator polynomial p(x) of degree n, $g(f(M(x)) \bmod p(x))$. The generator polynomial is calculated as $p(x)=(1-x) \cdot p_1(x)$, where $p_1(x)$ is a primitive polynomial of degree n−1 which is selected, based on a first cryptographic key, from the set of primitive polynomials of degree n−1 over a Galois Field, in particular GF(2). The first cryptographic key is a shared secret known to the sender and the receiver of the message. Preferably, the primitive polynomial is selected pseudo-randomly.

Method 400 may further comprise selecting 402 the primitive polynomial and calculating 403 the generator polynomial. Alternatively, method 400 may further comprise receiving the primitive polynomial, or information describing how to generate the primitive polynomial, and calculating the generator polynomial based on the received primitive polynomial or the received information describing how to generate the primitive polynomial (not shown in FIG. 4). As yet a further alternative, method 400 may further comprise receiving the generator polynomial or information describing how to generate the generator polynomial (not shown in FIG. 4). The primitive polynomial, the generator polynomial, or information describing how to generate the respective polynomial, may be received from another device involved in the communication session, or from a third party. For instance, sender 101 may receive the primitive polynomial, the generator polynomial, or information describing how to generate the respective polynomial, from receiver 102, key or AAA server 106, or the like.

Encoding 407 the message and the appended cryptographic checksum into an FEC codeword may optionally comprise generating one or more check bits of the FEC code based on the message and the appended cryptographic checksum, and appending the generated FEC check bits to the message and the appended cryptographic checksum. This is the case for separable FEC codes.

Method 400 may further comprise pseudo-randomly generating 404 a pad s of length n, wherein the first function g comprises an addition with the pad s. Pad s may be generated based on a second cryptographic key which may be equal to, or different from, the first cryptographic key. The second and the first cryptographic keys are shared secret known to the sender and the receiver of the message. Optionally, at least one of primitive polynomial $p_1(x)$ and pad s, or both, may be generated dependent on information which is specific for the message, such as a message sequence number, a time stamp, a random number, or the like.

Figure 5:
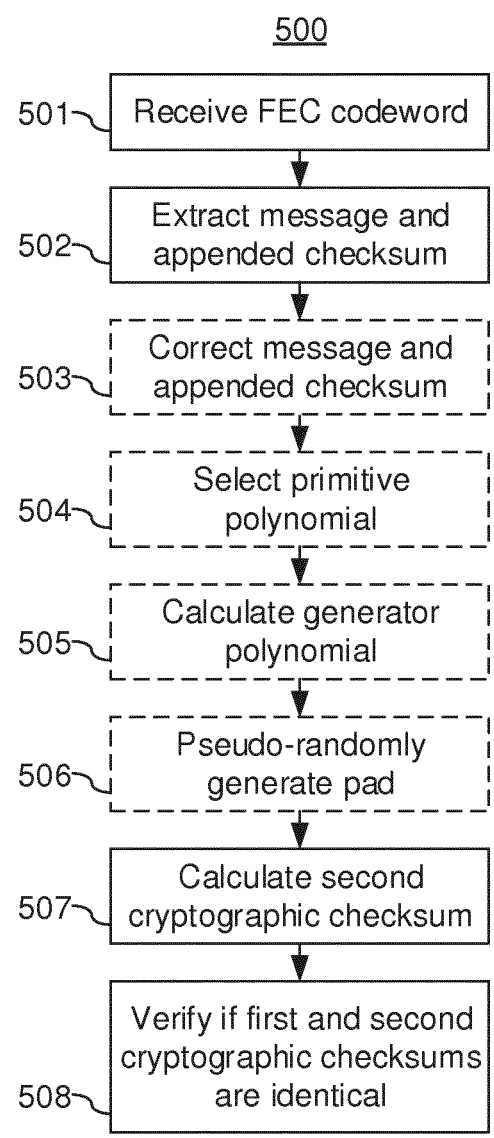
FIG. 5 shows a flow chart for a method of a receiver, in accordance with an embodiment of the invention.

In FIG. 5, an embodiment 500 of the method of a receiver device for authenticating a message is illustrated. An embodiment of method 500 may, e.g., be performed by receiver 102. Method 500 comprises receiving 501 an FEC codeword, i.e., an encoded representation of the message and an appended first cryptographic checksum, extracting 502 the message and the appended first cryptographic checksum from the FEC codeword by decoding the FEC codeword, generating a second cryptographic checksum for the message, and verifying 508 if the first cryptographic checksum and the second cryptographic checksum are identical. If not, the integrity of the message could not be established. That is, the message has been modified, either accidentally/randomly or intentionally/maliciously.

More specifically, generating the second cryptographic checksum comprises calculating 505 the cryptographic checksum as a first function g of a division of a second function of M(x), $f(M(x))$, modulo a generator polynomial p(x) of degree n, $g(f(M(x)) \bmod p(x))$. The generator polynomial is calculated as $p(x)=(1-x) \cdot p_1(x)$, where $p_1(x)$ is a primitive polynomial of degree n−1 which is selected, based on a first cryptographic key, from the set of primitive polynomials of degree n−1 over a Galois Field, in particular GF(2). The first cryptographic key is a shared secret known to the sender and the receiver of the message. Preferably, the primitive polynomial is pseudo-randomly selected.

Method 500 may further comprise selecting 504 the primitive polynomial and calculating 505 the generator polynomial. Alternatively, method 500 may further comprise receiving the primitive polynomial, or information describing how to generate the primitive polynomial, and calculating the generator polynomial based on the received primitive polynomial or the received information describing how to generate the primitive polynomial (not shown in FIG. 5). As yet a further alternative, method 500 may further comprise receiving the generator polynomial or information describing how to generate the generator polynomial (not shown in FIG. 5). The primitive polynomial, the generator polynomial, or information describing how to generate the respective polynomial, may be received from another device involved in the communication session, or from a third party. For instance, receiver 102 may receive the primitive polynomial, the generator polynomial, or information describing how to generate the respective polynomial, from sender 101, key or AAA server 106, or the like.

Optionally, the FEC codeword may comprise the message, the appended first cryptographic checksum, and one or more appended check bits of the FEC code. In this case method 500 may further comprise correcting 503 the message and the appended first cryptographic checksum based on the appended FEC check bits.

Method 500 may further comprise pseudo-randomly generating 506 a pad s of length n, wherein the first function g comprises an addition with the pad s. Pad s may be generated based on a second cryptographic key which may be equal to, or different from, the first cryptographic key. The second and the first cryptographic keys are shared secret known to the sender and the receiver of the message. Optionally, at least one of primitive polynomial $p_1(x)$ and pad s, or both, may be generated dependent on information which is specific for the message, such as a message sequence number, a time stamp, a random number, or the like.

The computation of cryptographic checksums in accordance with embodiments of the invention is based on the same type of operations as is used for conventional CRCs. Therefore, it retains most of the simplicity of traditional CRCs except that embodiments of the invention utilize a variable pseudo-random generator polynomial. Accordingly, implementing embodiments of the invention in hardware is simple, and the resulting implementations are very resource efficient. The operation of division modulo a polynomial over GF(2) may be implemented through an LFSR, where the taps of the LFSR determine the generator polynomial $p(x)$, as is known in the art. Even multiplication by $x^n$ can be implemented in hardware with high performance. However, in contrast to traditional CRCs, where the generator polynomial is fixed and known in advance and the implementing circuits typically have feedback connections which determine the generator polynomial hardwired, a cryptographic checksum in accordance with embodiments of the invention requires an implementation in which the feedback connections are programmable. It is the actual configuration of these feedback connections which is the key for the hashing and which should be changeable and secret. Note that some non-cryptographic CRC circuits also may use programmable connections if they need to support different CRC standards based on different generator polynomials, or to support different polynomial degrees [see, e.g., J. Birch, L. G. Christensen, and M. Skov, "A programmable 800 Mbit/s CRC check/generator unit for LANG and MANs", Comp. Networks and ISDN Sys., 1992].

Efficient implementations of CRC generators in software exist, too. In these implementations, significant speed up is achieved by using pre-computed tables which depend on the particular cryptographic key based on which the primitive polynomial is pseudo-randomly selected. Therefore, they are computed only once per cryptographic key, which is affordable in many applications.

The functions in the hash function family according to embodiments of the invention are essentially defined by the generator polynomial $p(x)$, and not by the length of the messages to which the hash functions are applied. Therefore, they can be applied to messages of different lengths, as is desirable in practice. In particular, the polynomial corresponding to a message $M(x)$ should have "1" as leading coefficient, rather than "0" (if M is of length m, then $M(x)$ is of proper degree m). This determines a one-to-one mapping between messages and polynomials and, in particular, prevents changing the message by just appending zeros to it. For instance, a message 01011 should be treated as a 4-bit message 1011 rather than as a 5-bit message. Otherwise, both messages are represented by the same message polynomial $1 \cdot x^3 + 0 \cdot x^2 + 1 \cdot x^1 + 1 \cdot x^0 = x^3 + x^1 + 1$ and will accordingly have the same checksum after encoding. Otherwise an adversary could simply append one or more leading zeros to a message, knowing that the new message should have the same checksum. Alternatively, or additionally, an explicit length indication may be used as input to the authentication/verification process, e.g., by prepending or appending the message length to the message.

On the receiver side, verification of a message's integrity can be efficiently implemented by a Finite State Machine (FSM) which processes the message more or less simultaneously with the sequential reception of message elements, an element typically being a bit. Such FSMs may also be integrated within the Medium Access Control (MAC) layer of the receiver and typically consist of a checksum decoder, a comparator and a control block. The checksum decoder re-computes the check bits for the received message elements as they arrive one-by-one, i.e., bit-by-bit. The comparator compares the re-computed check bits with the check bits received in the message, i.e., the authentication tag or checksum. If the re-computed and the received check bits disagree, the comparator sends an error signal to the control block, indicating that the integrity of the message could not be verified.

Figure 6:
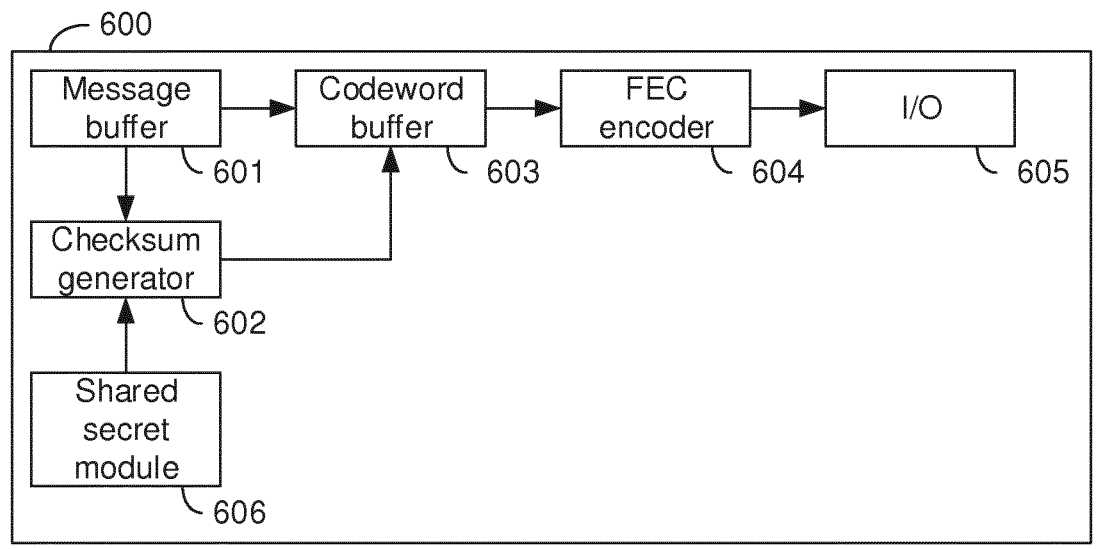
FIG. 6 shows a sender, in accordance with an embodiment of the invention.

In FIG. 6, an embodiment 600 of the sender device for authenticating a message is illustrated, such as sender 101 shown in FIG. 1. Sender 600 comprises a message buffer 601 for acquiring the message, e.g., from a higher layer of a communication stack of sender 600 or an application being executed by sender 600, a checksum generator 602 for generating a cryptographic checksum for the message, a codeword buffer 603 for forming a codeword by appending the generated cryptographic checksum to the message, an FEC encoder 604 for encoding the message and the appended cryptographic checksum into an FEC codeword, an interface 604 for transmitting the FEC codeword ("I/O" in FIG. 6), and a shared secret module 606 for providing checksum generator 602 with a first cryptographic key, i.e., a shared secret known to sender 600 and the receiver of the message. Interface 605 may, e.g., be a network interface or a radio transceiver configured for effecting communications with a RAN.

More specifically, checksum generator 602 is configured for generating the cryptographic checksum by calculating the cryptographic checksum as a first function g of a division of a second function of $M(x)$, $f(M(x))$, modulo a generator polynomial $p(x)$ of degree n, $g(f(M(x)) \mod p(x))$. The generator polynomial is calculated as $p(x)=(1-x) \cdot p_1(x)$, where $p_1(x)$ is a primitive polynomial of degree n−1 which is selected, based on a first cryptographic key, from the set of primitive polynomials of degree n−1 over a Galois Field, in particular GF(2).

Optionally, sender 600, in particular checksum generator 602, may be configured for selecting the primitive polynomial and calculating the generator polynomial. Alternatively, they may be configured for receiving the primitive polynomial, or information describing how to generate the primitive polynomial, and calculating the generator polynomial based on the received primitive polynomial or the received information describing how to generate the primitive polynomial (not shown in FIG. 6). As yet a further alternative, they may be configured for receiving the generator polynomial or information describing how to generate the generator polynomial (not shown in FIG. 6). The primitive polynomial, the generator polynomial, or information describing how to generate the respective polynomial, may be received from another device involved in the communication session, or from a third party. For instance, sender 101 may receive the primitive polynomial, the generator polynomial, or information describing how to generate the respective polynomial, from receiver 102, key or AAA server 106, or the like.

Checksum generator 602 may further be configured for pseudo-randomly generating a pad s of length n, wherein the first function g comprises an addition with the pad s. Pad s may be generated based on a second cryptographic key which may be equal to, or different from, the first cryptographic key. The second cryptographic key is a shared secret known to sender 600 and the receiver of the message. Accordingly, shared secret module 606 may further be configured for providing the second cryptographic key to checksum generator 602. Alternatively, pad s may be provided by an encryption algorithm, as was described hereinbefore, rather than being generated by checksum generator 602.

Optionally, checksum generator 602 may be configured for generating at least one of primitive polynomial $p_1(x)$ and pad s, or both, dependent on information which is specific for the message, such as a message sequence number, a time stamp, a random number, or the like. Such information may be utilized as input to checksum generator 602, in particular to an LFSR comprised in checksum generator 602.

Figure 7:
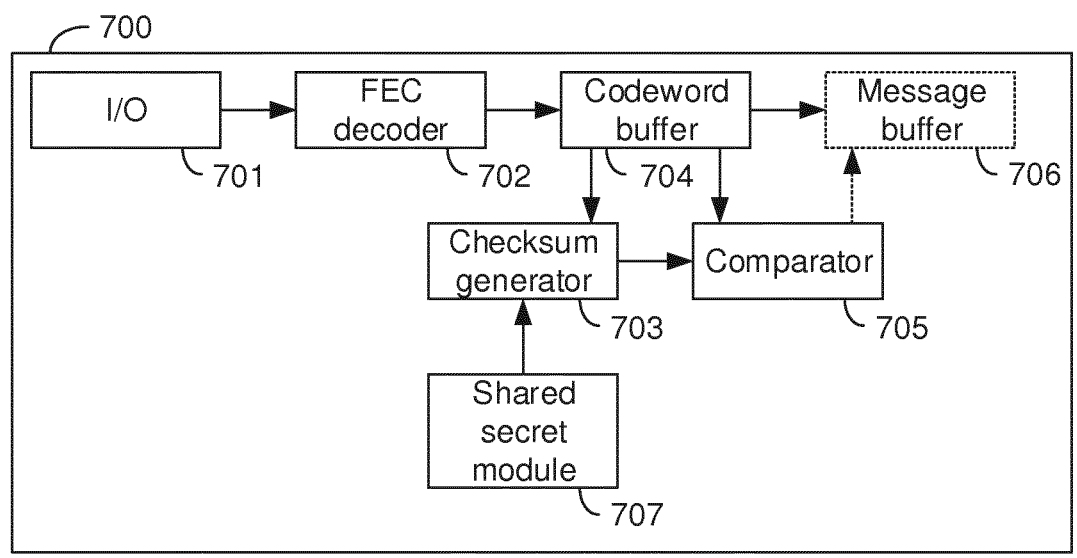
FIG. 7 shows a receiver, in accordance with an embodiment of the invention.

In FIG. 7, an embodiment 700 of the receiver device for authenticating a message is illustrated, such as receiver 102 shown in FIG. 1. Receiver 700 comprises an interface 701 for receiving an FEC codeword ("I/O" in FIG. 7), i.e., an encoded representation of the message and an appended first cryptographic checksum, an FEC decoder 702 for extracting the message and then appended first cryptographic checksum from the FEC codeword, a codeword buffer 704 for extracting the message and the first cryptographic checksum from the codeword output by FEC decoder 702, a checksum generator 703 for generating a second cryptographic checksum for the message, a comparator 705 for verifying if the first cryptographic checksum and the second cryptographic checksum are identical, and a shared secret module 707 for providing checksum generator 703 with the first cryptographic key, i.e., a shared secret known to receiver 700 and the sender of the message. Receiver 700 may further comprise a message buffer 706 for storing the received message and passing the message to a higher layer of a communication stack of receiver 700 or an application being executed by receiver 700 in response to an indication received by comparator 705 that the integrity of the received message has been verified. Interface 701 may, e.g., be a network interface or a radio transceiver configured for effecting communications with a RAN.

More specifically, checksum generator 703 is similar to checksum generator 602 described with reference to FIG. 6 and is configured for generating the second cryptographic checksum by calculating the cryptographic checksum as a first function g of a division of a second function of M(x), $f(M(x))$, modulo a generator polynomial p(x) of degree n, $g(f(M(x)) \bmod p(x))$. The generator polynomial is calculated as $p(x)=(1-x) \cdot p_1(x)$, where $p_1(x)$ is a primitive polynomial of degree n−1 which is selected, based on a first cryptographic key, from the set of primitive polynomials of degree n−1 over a Galois Field, in particular GF(2).

Optionally, receiver 700, in particular checksum generator 703, may be configured for selecting the primitive polynomial and calculating the generator polynomial. Alternatively, they may be configured for receiving the primitive polynomial, or information describing how to generate the primitive polynomial, and calculating the generator polynomial based on the received primitive polynomial or the received information describing how to generate the primitive polynomial (not shown in FIG. 7). As yet a further alternative, they may be configured for receiving the generator polynomial or information describing how to generate the generator polynomial (not shown in FIG. 7). The primitive polynomial, the generator polynomial, or information describing how to generate the respective polynomial, may be received from another device involved in the communication session, or from a third party. For instance, receiver 102 may receive the primitive polynomial, the generator polynomial, or information describing how to generate the respective polynomial, from sender 101, key or AAA server 106, or the like.

Checksum generator 703 may further be configured for pseudo-randomly generating a pad s of length n, wherein the first function g comprises an addition with the pad s. Pad s may be generated based on a second cryptographic key which may be equal to, or different from, the first cryptographic key. The second cryptographic key is a shared secret known to receiver 700 and the sender of the message. Accordingly, shared secret module 707 may further be configured for providing the second cryptographic key to checksum generator 703. Alternatively, pad s may be provided by an encryption algorithm, as was described hereinbefore, rather than being generated by checksum generator 703.

Optionally, checksum generator 703 may be configured for generating at least one of primitive polynomial $p_1(x)$ and pad s, or both, dependent on information which is specific for the received message, such as a message sequence number, a time stamp, a random number, or the like. Such information may be utilized as input to checksum generator 703, in particular to an LFSR comprised in checksum generator 703.

Embodiments of sender 600 and receiver 700 may be implemented in hardware, software, or a combination thereof, as is known in the art. For instance, modules 601-606 and modules 701-707 may be implemented by means of electronic circuitry, in particular digital binary logic. Alternatively, modules 601-606 and modules 701-707 may be implemented based on Digital Signal Processors (DSPs). It will be appreciated that interfaces 605 and 701 may comprise analog electronic circuitry configured for transmitting or receiving, respectively, the codeword over the air interface of a RAN.

Embodiments of checksum generators 602 and 703 operate very similar to standard CRC generators, the implementation of which is known in the art. Embodiments of checksum generators 602 and 703 which rely on a pseudo-randomly generated pad s may implement the addition of pad s by a bit-wise XOR operation between the n-bit string representing $f(M(x)) \bmod p(x)$ and the n-bit pad s.

Figure 8:
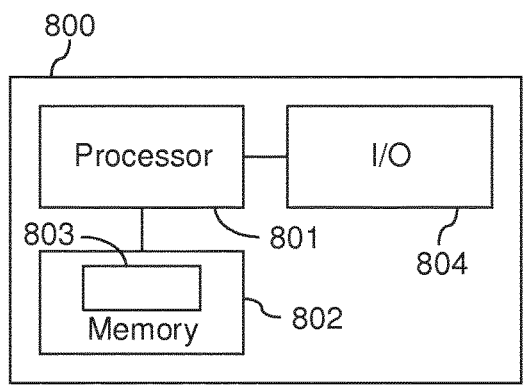
FIG. 8 shows a sender, in accordance with another embodiment of the invention.

In FIG. 8, an alternative embodiment 800 of the sender device for authenticating a message is shown. Sender 800 comprises a processor 801, e.g., a DSP, a memory 802 comprising software, i.e., a computer program 803 comprising computer-executable instructions, for causing sender 800 to implement an embodiment of the method of a sender of authenticating a message described hereinbefore, in particular with reference to FIG. 4, when the computer-executable instructions are executed on processor 801. Sender 800 may further comprise an interface 804 ("I/O" in FIG. 8) for effecting communications via a communications network, e.g., communications network 103. Interface 804 may, e.g., be a network interface or a radio transceiver configured for effecting communications with a RAN.

Figure 9:
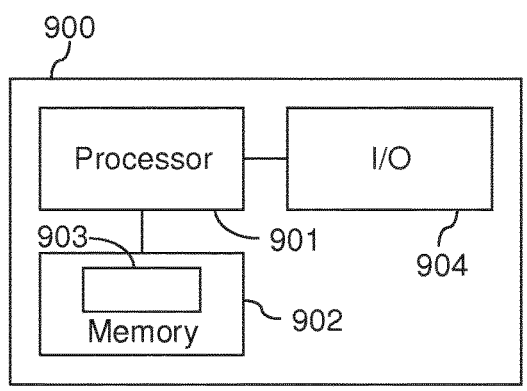
FIG. 9 shows a receiver, in accordance with another embodiment of the invention.

In FIG. 9, an alternative embodiment 900 of the receiver device for authenticating a message is shown. Receiver 900 comprises a processor 901, e.g., a DSP, a memory 902 comprising software, i.e., a computer program 903 comprising computer-executable instructions, for causing receiver 900 to implement an embodiment of the method of a receiver of authenticating a message described hereinbefore, in particular with reference to FIG. 5, when the computer-executable instructions are executed on processor 901. Receiver 900 may further comprise an interface 904 ("I/O" in FIG. 9) for effecting communications via a communications network, e.g., communications network 103. Interface 904 may, e.g., be a network interface or a radio transceiver configured for effecting communications with a RAN.

Figure 10:
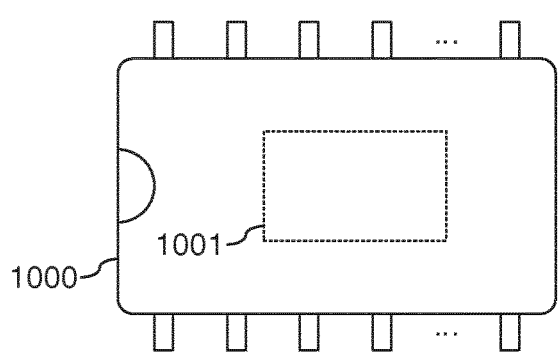
FIG. 10 shows an IC, in accordance with an embodiment of the invention.
Figure 11:
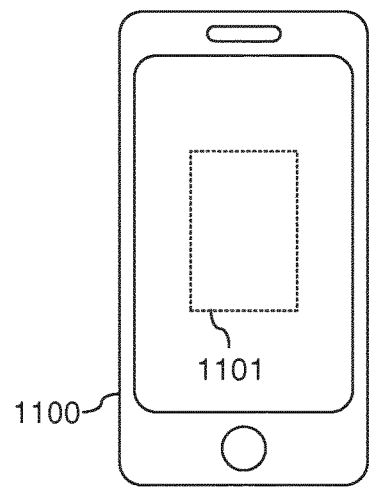
FIG. 11 shows a mobile phone, in accordance with an embodiment of the invention.

Embodiments 1001 of the sender and the receiver described with reference to FIGS. 6 to 9 may be implemented in an Integrated Circuit (IC) 1000 illustrated in in FIG. 10. Further, embodiments 1101 of the sender and the receiver described with reference to FIGS. 6 to 9 may also be implemented in a mobile terminal, such as mobile phone 1100 illustrated in FIG. 11. As yet a further alternative, embodiments 1101 of the sender and the receiver described with reference to FIGS. 6 to 9 may also be implemented in a node of a RAN, e.g., a gateway, an RNC, or a radio access node, such as an RBS, a NodeB, an eNodeB, a WLAN access point, or the like.

The person skilled in the art realizes that the invention by no means is limited to the embodiments described above. On the contrary, many modifications and variations are possible within the scope of the appended claims.

APPENDIX

The totient function $\phi(k)$, also called Euler's totient function, is defined as the number of positive integers less than or equal to k which are relatively prime to k, i.e., which do not contain any factor in common with k. It is known that, if k is prime, then $\phi(k)=k-1$. It is also known that, if k is of type $k^a$ where k is prime and a>0, then $\phi(k^a)=k^a-k^{a-1}$. Another property of the totient function, which is used in the proof below, is that $\phi(2^a-1) \geq \phi(2^a)$.

Theorem 1 For any values of n and m, the family of hash functions based on a generator polynomial of type $$p(x)=(1+x) \cdot p_1(x), \quad (1)$$

where $p_1(x)$ is a primitive polynomial of degree n-1, is ε-opt-secure for $$\varepsilon \leq \frac{m+n-1}{\phi(2^{n-1}-1)}. \quad (2)$$

Proof: A family of hash functions is ε-opt-secure if it is +-linear and ε-balanced. The family of hash functions based on generator polynomials of the type according to Eq. (1) is +-linear since the division modulo a polynomial is a linear operation, where addition is equivalent to a bit-wise XOR operation. To show that the family is also ε-balanced, we observe that, on one hand, for any polynomial p(x) of degree n over GF(2), any non-zero message M of length m, and any string c of length n, $h_p(M)=c$ if and only if $M(x) \cdot x^n$ mod $p(x)=c(x)$. On the other hand, $M(x) \cdot x^n$ mod $p(x)=c(x)$ if and only if p(x) divides $M(x) \cdot x^n - c(x)$.

Let $q(x)=M(x) \cdot x^n - c(x)$. Obviously, q(x) is a non-zero polynomial of degree less than or equal to m+n, and p(x) is a polynomial of degree n which divides q(x). Since $p(x)=(1+x) \cdot p_1(x)$, this implies that both 1+x and $p_1(x)$ are factors of q(x). Because of the unique factorization property, there are at most (m+n-1)/(n-1) prime factors of q(x), each of degree n-1. In other words, there are at most (m+n-1)/(n-1) hash functions in the CRC family that map M into c. On the other hand, the size of the hash family is equal to the number of primitive polynomials of degree n-1 over GF(2), which is $\phi(2^{n-1}-1)/n-1$. Therefore, $$Pr[h_p(M)=c] \leq \frac{m+n-1}{\phi(2^{n-1}-1)}. \quad (3)$$

If $2^{n-1}-1$ is prime, then Eq. (2) reduces to $$\varepsilon \leq \frac{m+n-1}{2^{n-1}-2}. \quad (4)$$

Since $\phi(2^{n-1}) \geq \phi(2^{n-1})=2^{n-2}$, for a general case, we can approximate Eq. (2) as follows:

$$\varepsilon \leq \frac{m+n-1}{2^{n-2}}. \quad (5)$$

The invention claimed is:

1. A method by a sender device for authenticating a message M(x), the method comprising:
    acquiring the message M(x);
    generating a cryptographic checksum for the message M(x), wherein generating the cryptographic checksum comprises calculating the cryptographic checksum as a first function g of a division of a second function of the message M(x), $f(M(x))$, modulo a generator polynomial p(x) of degree n, $g(f(M(x)) \mod p(x))$, wherein the generator polynomial p(x) is calculated as $p(x)=(1-x) \cdot p_1(x)$, and $p_1(x)$ is a primitive polynomial of degree n-1 that is selected, based on a first cryptographic key, from a set of primitive polynomials of degree n-1 over a Galois Field;
    appending the cryptographic checksum to the message M(x); and
    transmitting the message M(x) and the cryptographic checksum.

2. A method by a receiver device for authenticating a message M(x), the method comprising:
    receiving the message M(x) and a first cryptographic checksum appended to the message M(x);
    generating a second cryptographic checksum for the message M(x), wherein generating the second cryptographic checksum comprises calculating the second cryptographic checksum as a first function g of a division of a second function of the message M(x), $f(M(x))$, modulo a generator polynomial p(x) of degree n, $g(f(M(x)) \mod p(x))$, wherein the generator polynomial p(x) is calculated as $p(x)=(1-x) \cdot p_1(x)$, and $p_1(x)$ is a primitive polynomial of degree n-1 that is selected, based on a first cryptographic key, from a set of primitive polynomials of degree n-1 over a Galois Field; and
    verifying whether the first cryptographic checksum and the second cryptographic checksum are identical.

3. A sender device configured for authenticating a message M(x), the sender device comprising:
    processing circuitry; and
    a memory comprising instructions that when executed by the processing circuitry cause the sender device to:
        acquire the message M(x);

generate a cryptographic checksum for the message $M(x)$ by calculating the cryptographic checksum as a first function g of a division of a second function of the message $M(x)$, $f(M(x))$, modulo a generator polynomial $p(x)$ of degree n, $g(f(M(x)) \bmod p(x))$, wherein the generator polynomial $p(x)$ is calculated as $p(x)=(1-x) \cdot p_1(x)$, and $p_1(x)$ is a primitive polynomial of degree n−1 that is selected, based on a first cryptographic key, from a set of primitive polynomials of degree n−1 over a Galois Field;

append the cryptographic checksum to the message $M(x)$; and transmit the message $M(x)$ and the cryptographic checksum.

4. The sender device according to claim 3, wherein the memory comprises instructions that cause the sender device to:

select the primitive polynomial; and calculate the generator polynomial $p(x)$.

5. The sender device according to claim 3, wherein the memory comprises instructions that cause the sender device to:

receive the primitive polynomial or information describing how to generate the primitive polynomial; and calculate the generator polynomial $p(x)$ based on the received primitive polynomial or the received information describing how to generate the primitive polynomial.

6. The sender device according to claim 3, wherein the memory comprises instructions that cause the sender device to:

receive the generator polynomial $p(x)$ or information describing how to generate the generator polynomial $p(x)$.

7. The sender device according to claim 3, wherein the primitive polynomial is pseudo-randomly selected.

8. The sender device according to claim 3, wherein the memory comprises instructions that cause the sender device to generate a pad of length n, wherein the first function g comprises an addition with the pad.

9. The sender device according to claim 3, wherein the primitive polynomial is selected additionally based on information that is specific for the message $M(x)$.

10. The sender device according to claim 9, wherein the information that is specific for the message $M(x)$ comprises a message sequence number.

11. The sender device according to claim 3, wherein the second function $f(M(x))$ comprises a multiplication with a fixed polynomial $x^n$.

12. The sender device according to claim 3, wherein the memory comprises instructions that cause the sender device to:

encode the message $M(x)$ and the cryptographic checksum appended to the message $M(x)$ into a codeword of a Forward Error Correction (FEC) code, wherein the message $M(x)$ and the cryptographic checksum are transmitted with the FEC codeword.

13. The sender device according to claim 12, wherein the memory comprises instructions that cause the sender device to encode the message $M(x)$ and the cryptographic checksum into a codeword of an FEC code by:

generating one or more check bits of the FEC code based on the message $M(x)$ and the cryptographic checksum; and appending the one or more check bits of the FEC code to the message $M(x)$ and the cryptographic checksum.

14. The sender device according to claim 3, wherein the sender device comprises one of: a mobile terminal configured for operation in a communications network, or a radio access node configured for operation in a communications network.

15. A receiver device configured for authenticating a message $M(x)$, the receiver device comprising:

processing circuitry; and a memory comprising instructions that when executed by the processing circuitry cause the receiver device to:

receive the message $M(x)$ and a first cryptographic checksum appended to the message $M(x)$;

generate a second cryptographic checksum for the message $M(x)$ by calculating the second cryptographic checksum as a first function g of a division of a second function of the message $M(x)$, $f(M(x))$, modulo a generator polynomial $p(x)$ of degree n, g $(f(M(x)) \bmod p(x))$, wherein the generator polynomial $p(x)$ is calculated as $p(x)=(1-x) \cdot p_1(x)$, and $p_1(x)$ is a primitive polynomial of degree n−1 that is selected, based on a first cryptographic key, from a set of primitive polynomials of degree n−1 over a Galois Field; and verify whether the first cryptographic checksum and the second cryptographic checksum are identical.

16. The receiver device according to claim 15, wherein the message $M(x)$ and the first cryptographic checksum are received with a codeword of a Forward Error Correction (FEC) code, wherein the memory comprises instructions that cause the receiver device to:

extract the message $M(x)$ and the first cryptographic checksum from the FEC codeword.

17. The receiver device according to claim 16, wherein the FEC codeword comprises the message $M(x)$, the first cryptographic checksum appended to the message $M(x)$, and one or more check bits of the FEC code appended to the message $M(x)$, and wherein the memory comprises instructions that cause the receiver device to extract the message $M(x)$ and the first cryptographic checksum from the FEC codeword by:

correcting the message $M(x)$ and the first cryptographic checksum based on the one or more check bits of the FEC code.

18. The receiver device according to claim 15, wherein the receiver device comprises one of: a mobile terminal configured for operation in a communications network, or a radio access node configured for operation in a communications network.

* * * * *

UNITED STATES PATENT AND TRADEMARK OFFICE
CERTIFICATE OF CORRECTION

PATENT NO. : 10,623,187 B2
APPLICATION NO. : 15/558844
DATED : April 14, 2020
INVENTOR(S) : Dubrova et al.

It is certified that error appears in the above-identified patent and that said Letters Patent is hereby corrected as shown below:

In the Specification

In Column 2, Line 66, delete "$p(x)=(1-x)-p_1(x),$" and insert -- $p(x)=(1-x) \cdot p_1(x)$, --, therefor.

In Column 4, Line 8, delete "ivković," and insert -- Živković, --, therefor.

In Column 12, Line 23, delete "ivković," and insert -- M. Živković, --, therefor.

In Column 17, Line 39, delete "LANG" and insert -- LAN6 --, therefor.

In Column 18, Line 31, delete "interface 604" and insert -- interface 605 --, therefor.

Signed and Sealed this
Twelfth Day of January, 2021

Andrei Iancu
*Director of the United States Patent and Trademark Office*